Patented Apr. 6, 1948

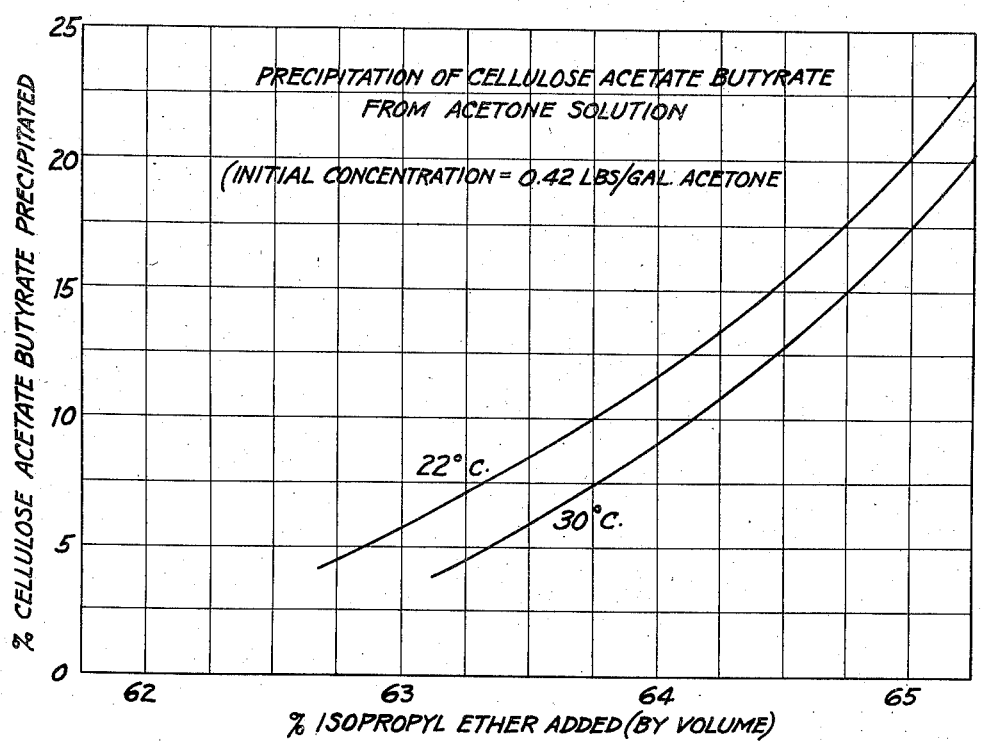

2,439,111

UNITED STATES PATENT OFFICE 2,439,111

FRACTIONAL PRECIPITATION OF CELLULOSE BUTYRATES

John W. Tamblyn and Donald R. Morey, Rochester, N. Y., assignors to Eastman Kodak Company, Rochester, N. Y., a corporation of New Jersey Application September 19, 1945, Serial No. 617,248

4 Claims. (Cl. 260—230)

This application relates to a method of improving the properties of butyric acid esters of cellulose in which the esters while in solution in an organic solvent are subjected to treatment by a lower aliphatic ether thereby precipitating from the ester a lower molecular weight portion thereof.

It is commonly recognized that the ordinary organic acid esters of cellulose are heterogeneous in composition with respect to their molecular weights. For instance, with ordinary cellulose esters the molecular weights of the components thereof may range to as low as 5,000 or to as high as 500,000. It is also commonly recognized that the physical properties of the cellulose organic acid esters are dependent not only upon the average molecular weight of those esters but also upon the proportion of low molecular weight components which are present therein. It is generally recognized that when lower molecular weight components of cellulose esters are present in large percentage, the mechanical properties of the cellulose esters are below standard. It has been recognized that with the cellulose organic acid esters if the lower molecular weight components such as those having a molecular weight less than 50,000 are removed, the properties of the cellulose esters are considerably improved. These facts have led both to the development of processes of making cellulose esters with a minimum of low molecular weight components therein and processes for the separation of those lower molecular weight components from the remainder of the cellulose esters. The present invention belongs in the second category.

Various methods have been suggested for separating the components of cellulose esters having different molecular weights. One method which has been suggested for the separation of the components of cellulose acetate in accordance with their molecular weights, is fractional precipitation. In this method a nonsolvent is mixed with a solution of the cellulose ester and ordinarily a higher molecular weight fraction precipitates therefrom. This method involves the obtaining of several cuts or fractions, the undesired material remaining in solution in the organic solvent used. In processes of this type, several precipitation steps are necessary to arrive at the required fractionation. Also after the various cuts have been obtained, they are usually mixed together to obtain the portion of the cellulose ester of higher molecular weight which is useful. In this process the undesired components of cellulose ester remain in solution at the end of the process and for economy of operation the solvents are separated therefrom.

Another method for separating low molecular weight components from cellulose acetates is the fractional extraction therefrom of the lower molecular weight components. In this case one ends up with the undesired material in solution in a solvent and here again solvent recovery is desirable. None of these prior processes have to the applicants' knowledge been found to have any commercial significance, the cellulose ester products marketed today having been obtained without the use of either fractional precipitation or fractional extraction.

One object of our invention is to provide a process for separating the components of butyric acid esters of cellulose in which processes the lower molecular weight components of the cellulose ester are precipitated from a solution of that ester in an organic solvent. Another object of our invention is to provide a process for improving the characteristics of a butyric acid ester of cellulose in solution in which a small proportion of the ester is precipitated by means of an aliphatic ether, the alkyls of which are of 2–6 carbon atoms. Other objects of our invention will appear herein.

We have found that when cellulose esters having high butyryl content are dissolved in a solvent and treated with a small proportion of a lower aliphatic ether that the lower components of the cellulose ester become insoluble and precipitate whereas the higher molecular weight portion of the cellulose ester remains in solution and may be either employed directly or removed as a pure product. We have found that many of the various ethers, the alkyls of which are 2–6 carbon atoms may be employed in the precipitating operation to remove fractions which would otherwise diminish the useful characteristics of the cellulose ester.

Ordinarily organic acid esters of cellulose contain less than 15% of material or components therein having a molecular weight of less than 50,000 and therefore in the carrying out of this invention only sufficient precipitation is carried out to precipitate a proportion of the cellulose ester less than 15% of the total ester and thereby retain the portion of the ester above 50,000 molecular weight. Most generally the proportion of lower molecular weight components of cellulose ester is within the range of from 5 to 10% and it is preferred that the proportion of the ester which is precipitated in fractionation in accordance with our invention be within the range of 5 to 10%. The amount of ether necessary for the desired precipitate varies with the conditions of operation. For instance, ordinarily it is desirable practice to incorporate the ether into the solution of cellulose ester at a slightly elevated temperature and to induce the precipitation of low molecular weight constituents by dropping the temperature after a uniform mixture has been obtained. The amount of precipitant used will vary according to the amount of cooling used, the type of solvent which is employed for dissolving the cellulose ester and the percentage of the cellulose ester which it is desired to separate out.

The cellulose esters which we have found to be suitable for use in our invention and which will precipitate the lower molecular weight components under the conditions described herein are the butyric acid esters having a butyryl of at least 16% preferably a butyryl content of at least 25%. The best known esters of this type are the cellulose acetate butyrates and it is to the improvement of the acetate butyrates of high butyryl content that our invention is particularly directed. Some of the butyric acid esters of cellulose which may be improved by our process are the cellulose acetate butyrates having a butyryl content of approximately 38% and an acetyl content of approximately 13%, cellulose acetate butyrates having a butyrate content of 48% and an acetyl content of approximately 5%, cellulose acetate butyrates having a butyryl content of 54% and an acetyl content of approximately 1½% and cellulose acetate butyrates having a butyrate content of 36 to 38% and an acetyl content of approximately 12%. These butyric acid esters of cellulose are merely listed for purposes of illustration as other butyric acid esters of cellulose within the ranges mentioned may be used as the starting material for the improvement processes in accordance with our invention.

In the proposed embodiment of our invention, the butyric acid ester of cellulose is first dissolved in an organic solvent. An amount of lower aliphatic ether is then incorporated in that solvent at an elevated temperature, below the boiling point of the ether, but avoiding precipitation of the cellulose ester. After the thorough mixing of the ether and the cellulose ester solution, the temperature is brought down to that at which the desired proportion of precipitate is obtained. This precipitate which consists of lower molecular weight components of the cellulose ester is allowed to settle and the resulting solution comprises the cellulose ester with low molecular weight components removed, in solution in a mixture of a solvent and ether. The attached drawing consists of a graph illustrating the behavior of the cellulose acetate butyrate using one particular solvent namely acetone, and using one particular ether, namely isopropyl ether. One curve illustrates the proportion of cellulose ester precipitated with various amounts of isopropyl ether when cooling to 30° C. is used and the other curve of the graph illustrates the result obtained when cooling to 22° C. is used. For instance, if 10% precipitation is desired, either a 22° C. temperature may be used and 63.75% isopropyl ether by volume added or a temperature of 30° C. may be used and slightly more isopropyl ether is in that case necessary. It may be seen from the graph that using a given solvent some variation may be expected both with a difference in degree of cooling and a difference in proportion of ether used.

With the use of different solvents, the amount of ether which is employed will vary. For instance if the cellulose ester as illustrated in the graph had been dissolved in ethylene chloride instead of acetone a precipitate of a 10% portion of cellulose ester would have been obtained with the use of 53% instead of 63.75% of isopropyl ether. If aniline, on the other hand, were employed as the solvent approximately 73% of isopropyl ether would be required to obtain 10% precipitation upon cooling to 22° C. in accordance with our invention.

The various ethers also differ in their effectiveness as precipitating agents. If ethyl ether were employed to cause the precipitation as illustrated in the graph, the percentage of ethyl ether required to obtain a 10% precipitate upon cooling to 22° C. would be approximately 78%. With N-butyl ether approximately 60% of that ether would be required whereas with n-hexyl ether approximately 47% thereof would accomplish the same degree of precipitation as was accomplished by 63.75% of isopropyl ether.

Various organic solvents may be employed to dissolve the cellulose acetate butyrate in our fractionation process. We have found acetone and ethylene chloride both to be quite suitable for this purpose and therefore those solvents are particularly recommended for use in our process. Nevertheless, other solvents have been found to be useful, some of those which come within this category being: aniline, pyridine, cyclohexane, ethyl lacetate, dioxane, $\beta,\beta'$-dichloroethyl ether, ethylene chlorohydrin, glacial acetic acid, ethylene glycol monomethyl ether and ethyl acetate. Whereas with some of the solvents a proportion of isopropyl ether of as much as 75% to obtain a certain percentage of precipitate would be necessary, other of the solvents would require only a per cent of isopropyl ether of 53% to obtain the same percentage of precipitate as illustrated, for instance by ethylene chloride or ethyl acetate.

After the precipitation of the unwanted fraction from the butyric acid ester of cellulose in accordance with our invention, that portion of the ester which remains in solution may be drawn off into a separate vessel and completely precipitated by the further addition of ether or by the addition of some other precipitate such as water. The precipitant used may be one forming two phases with the mixture of solvent and ether thus allowing the recovery of one of the liquids by decantation. If desired, instead of precipitating the ester from its solution that solution may be employed directly for various processes, particularly if both the solvent and ether employed are of low boiling type. If desired, however, particularly with higher boiling ethers, reduced pressure might be employed in the preparation of products therefrom. The precipitation of cellulose esters from solution after fractionation may serve as a refining operation so that our process may be made to serve as a reprecipitation operation in obtaining a refined cellulose ester.

It is desirable in the treatment of the butyric acid esters of cellulose in accordance with our invention that the components having a molecular weight below 50,000 be removed, or in other words that these components form the bulk of the precipitate. In substantially all of the cellulose esters within the terms of our invention, the precipitate need be less than 15% of the ester in order to remove substantially all of the components having a molecular weight below 50,000. In the preferred embodiment of our invention, the precipitate of the cellulose ester portion constitutes a percentage within the range of 5 to 10% of the original material employed. Some solvents which have been mentioned herein are more effective than others as regards selectivity in precipitation with lower aliphatic ethers of the lower molecular weight components of cellulose acetate butyrates and therefore in some cases it may be desirable to precipitate a larger percentage of the ester than in cases where the solvent-precipitant system is more effective. We have found that acetone and ethylene chloride are the most selective of any of the solvents listed in precipitation of the lower molecular weight components of the cellulose acetate butyrates. The following examples illustrate our invention:

*Example I.*—100 pounds of cellulose acetate butyrate having an acetyl content of 13% and a butyryl content of 37% are dissolved in 228 gallons of acetone. This solution is placed in a vessel maintained at 50° C. and when the system has reached this temperature, 419 gallons of isopropyl ether are stirred into the mass. The mixture is kept at 50° C. for one hour after which the vessel is cooled to 30° C. whereupon a precipitate forms and is allowed to settle for 24 hours at 30° C. The precipitate constitutes 7.3% of the original material. The supernatant liquor is drawn off and subjected to complete precipitation, filtration, washing and drying. As illustrated by the accompanying drawing, control of the temperature and the amount of isopropyl ether added may remove any desired percentage of the cellulose acetate butyrate as precipitate.

*Example II.*—The solution as prepared in the preceding example is placed in a vessel maintained at 22° C. and 419 gallons of isopropyl ether at the same temperature is slowly added with vigorous stirring over a period of one hour. The resulting suspension is allowed to stand at 22° C. for 24 hours and the precipitate is then removed. The precipitate contains 9.8% of the original material. The supernatant liquor is led off to a precipitation and recovery process as in the preceding example.

Our invention is directed to the fractionation of the butyric acid esters of cellulose having a considerable butyryl content, preferably of 25% and more. The principal representatives of this class at the present time are the cellulose acetate butyrates. Also included, however, are the straight cellulose butyrates and the butyrates of cellulose having minor percentages of other acyl groups such as the cellulose propionate butyrates and the cellulose acetate propionate butyrates. Our invention may be employed on either low, medium or high viscosity esters, being especially useful with the low viscosity type. The butyric acid esters of cellulose having a butyryl content of approximately 50% rarely exceed a viscosity of 100–200 C. P. S. in 10% solution in acetone at 25° C. The maximum viscosities known for cellulose acetate butyrates having a butyryl content of approximately 38% are 200–300 C. P. S. By means of our invention esters of these butyryl contents may be enhanced in viscosity by removal of low molecular weight components where present.

We claim:

1. A method of removing the lower molecular weight components of a cellulose ester which comprises dissolving a butyric acid ester of cellulose having a butyryl content of at least 16% in an organic solvent and then mixing therewith an amount of an ether having alkyls of 2-6 carbon atoms to precipitate less than 15% of the cellulose ester from the solution whereby lower molecular weight components of the cellulose ester are precipitated.

2. A method of removing lower molecular weight components of a cellulose ester which comprises dissolving a butyric acid ester of cellulose having a butyryl content of at least 16% in an organic solvent and then mixing therewith an amount of isopropyl ether to precipitate less than 15% of the cellulose ester from the solution whereby lower molecular weight components of the cellulose ester are precipitated.

3. A method of removing lower molecular weight components of a cellulose ester which comprises dissolving a butyric acid ester of cellulose having a butyryl content of at least 16% in acetone and then mixing therewith an amount of isopropyl ether to precipitate less than 15% of the cellulose ester from the solution whereby lower molecular weight components of the cellulose ester are precipitated.

4. A method of removing lower molecular weight components from a cellulose ester which comprises dissolving a cellulose acetate butyrate having a butyryl content of 35–40% in an organic solvent and then mixing therewith an amount of isopropyl ether to precipitate less than 15% of the cellulose ester from the solution whereby lower molecular weight components of the cellulose ester are precipitated.

JOHN W. TAMBLYN.
DONALD R. MOREY.

REFERENCES CITED

The following references are of record in the file of this patent:

FOREIGN PATENTS

| Number | Country | Date |
|---|---|---|
| 741,220 | France | Dec. 2, 1932 |